United States Patent [19]
> Spanur

[11] 3,802,923
[45] Apr. 9, 1974

[54] RESEALABLE VENT CLOSURE FOR SEALED GALVANIC DRY CELL

[75] Inventor: Frank G. Spanur, Parma Heights, Ohio

[73] Assignee: Union Carbide Corporation, New York, N.Y.

[22] Filed: Aug. 9, 1971

[21] Appl. No.: 169,909

[52] U.S. Cl.................. 136/178, 215/56, 220/44 A
[51] Int. Cl. ............................................. H01m 1/06
[58] Field of Search .............. 136/133, 178; 215/56; 220/44 A, 44 R

[56] References Cited
UNITED STATES PATENTS
| | | | |
|---|---|---|---|
| 3,320,094 | 5/1967 | Yamamoto et al. | 136/133 |
| 2,603,308 | 7/1952 | McCall | 220/44 R |
| 3,047,177 | 7/1962 | Poitras et al. | 215/56 |
| 3,503,811 | 3/1970 | Urry | 136/178 |

Primary Examiner—A. B. Curtis
Assistant Examiner—H. A. Feeley
Attorney, Agent, or Firm—John R. Doherty

[57] ABSTRACT

A galvanic dry cell including a cylindrical container having an open end is provided with a resealable vent closure comprising a disc-like cover fitting over the open end of the container and including a resilient flapper valve member formed at the outer portion of the cover. The resilient flapper valve member extends from the cover towards and into contact with a valve seat surrounding the open end of the container and forms a normally fluid-tight seal therewith. The valve seat is formed by inwardly turning the peripheral edge portions of the cell container at the open end thereof. Any excessive gas pressure which develops inside the cell causes the resilient flapper valve member to deflect in a direction away from the valve seat momentarily breaking the seal and allowing gas to escape.

16 Claims, 5 Drawing Figures

PATENTED APR 9 1974 3,802,923

INVENTOR
FRANK G. SPANUR
BY
ATTORNEY

RESEALABLE VENT CLOSURE FOR SEALED GALVANIC DRY CELL

This invention relates to sealed galvanic dry cells, and more particularly to a seal closure for the open end of a cylindrical container used in such dry cells, the closure incorporating a resealable vent for releasing excessive gas pressure from inside the cell container.

Galvanic dry cells are usually sealed in order to prevent the escape of liquid corrosive by-products of the electrochemical reactions that take place inside the cell during discharge. The seals are also generally adequate to prevent a substantial loss of electrolyte or mositure by evaporation which can seriously shorten the life of the cell, and to prohibit the ingress of air or oxygen from the atmosphere which can cause wasteful corrosion of active metal electrodes.

One of the major problems encountered in sealing dry cells has been that the cells can generate gaseous products as the electrochemical reactions proceed, sometimes in rather serious quantities if the cell is subjected to severe or abusive conditions of discharge. In order to avoid the potentially harmful effects that may occur due to the build-up of an excessive gas pressure inside the cell, various sorts of venting means for releasing gas pressure have been used. The venting means for the most part have been incorporated into the seal closure for the open end of the cell container.

In vented dry cells, the problem of preventing electrolyte or mositure loss through evaporation and that of air or oxygen ingress may become particularly troublesome. Such is the case, for example, in a zinc chloride dry cell using a zinc anode, a manganese dioxide cathode and an electrolyte composed predominantly of zinc chloride and water. This dry cell requires the presence of a substantial amount of immobilized water for its operation and the loss of water by evaporation can seriously reduce the discharge capacity of the cell. Thus in such dry cells, it is necessary that the venting means used remain tightly closed or sealed at all times until the moment gas venting occurs and that once the gas pressure has been released, the venting means must be capable of resealing itself.

Various types of resealable vents for use in dry cells have already been proposed. One such vent consists of a metal ball overlying a vent opening and biased into sealing engagement around the vent opening by means of a coil spring. The vent opens to release gas from inside the cell when the internal gas pressure reaches a predetermined limit as set by the coil spring. Once the internal gas pressure has been relieved, the coil spring causes the ball to reseat and to reseal the vent.

Another type of resealable vent is disclosed in U.S. Pat. No. 3,415,690 to Richman issued on Dec. 10, 1968. In this vent a flat elastomeric seal gasket overlies the vent opening and is retained in place by a resilient terminal cap on the top of the cell. This vent operates in basically the same manner as the vent previously described.

In U.S. Pat. No. 3,293,081 to Daley issued on Dec. 20, 1966, still another type of resealable vent is disclosed in which an elastomeric ring surrounds the vent opening and is retained in place under pressure by the terminal cap of the cell. Any excessive gas pressure which develops inside the cell causes the elastomeric ring to expand and thus to allow the escape of gas from inside the cell.

One rather significant drawback encountered with these prior art resealable vents has been that they require the addition of several or more parts in the dry cell and thus can greatly increase the cost of manufacture. Additionally, these parts must be accurately positioned during cell assembly if reliable and reproducible results are to be attained. This of course entails the use of expensive manufacturing equipment. Moreover, these prior art vents have usually been incorporated into some external part of the dry cell such as inside the top terminal cap which if damaged could result in the vent being rendered inoperative.

In U.S. Pat. No. 3,278,340 to Bell issued on Oct. 11, 1966, there is disclosed a resealable vent which is incorporated inside the cell proper and which is therefore less prone to damage. However, this vent structure is composed of at least two additional parts, namely a valve body and valve seat both of which must be accurately located during assembly of the dry cell.

It is therefore an important object of this invention to provide an improved resealable vent for use in a galvanic dry cell.

Another object of this invention is to provide a seal closure incorporating a resealable vent for the open end of a cylindrical container used in a galvanic dry cell.

Still another object of this invention is to provide such a resealable vent closure which requires the very minimum number of parts and which is therefore easy to assemble and inexpensive to manufacture.

A further object of this invention is to provide such a resealable vent closure which gives highly reliable and reproducible results in releasing excessive gas pressure from inside the dry cell.

A still further object of this invention is to provide such a resealable vent closure which is protected against damage by the outer cell assembly used to finish the dry cell.

The foregoing and other related objects are accomplished in accordance with the invention by the provision of a resealable vent closure for the open end of a cylindrical container used in a galvanic dry cell. The resealable vent closure comprises a disc-like cover fitting over the open end of the cell container and including a resilient flapper valve member as an integral part thereof. The valve member is formed at the outer portion of the cover which overlies a valve seat. The valve seat is formed by inwardly turning the peripheral edge portions of the cell container at the open end thereof. Preferably, the peripheral edge portions of the container are inwardly crimped to provide a smooth rounded surface for the valve seat. The inner portion of the cover preferably includes an inner ring flange member which extends through the open end of the cell container and which is provided with means for locking the cover in place. During assembly of the cover, the resilient flapper valve member is caused to engage with the valve seat so as to form a normally fluid-tight seal therewith. Any excessive gas pressure which develops inside the cell causes the resilient flapper valve member to deflect in a direction away from the valve seat momentarily breaking the seal and allowing gas to escape.

One of the principle advantages of the invention is that the resealable vent closure including all of its functional elements can be readily made in one piece by molding the closure from a resilient plastic material. The valve seat is formed by simply inwardly turning the peripheral edge portions of the cell container and consequently does not require the use of additional parts to provide the valve seating surfaces for the resealable vent. Thus the necessity for assembling a large number of valve parts together with the seal closure is eliminated and the cost of manufacturing the dry cell is significantly reduced.

The invention is particularly useful with a conventional primary galvanic dry cell in which the cell proper including the cylindrical cell container is encased within an outer cell assembly including an outer tubular jacket having both top and bottom closure plates locked thereto. The resealable vent closure for the cell container resides below the top closure plate and within the confines of the outer tubular jacket and is thus protected against possible damage by some external pressure or impact applied to the outer cell assembly.

Figure 1:
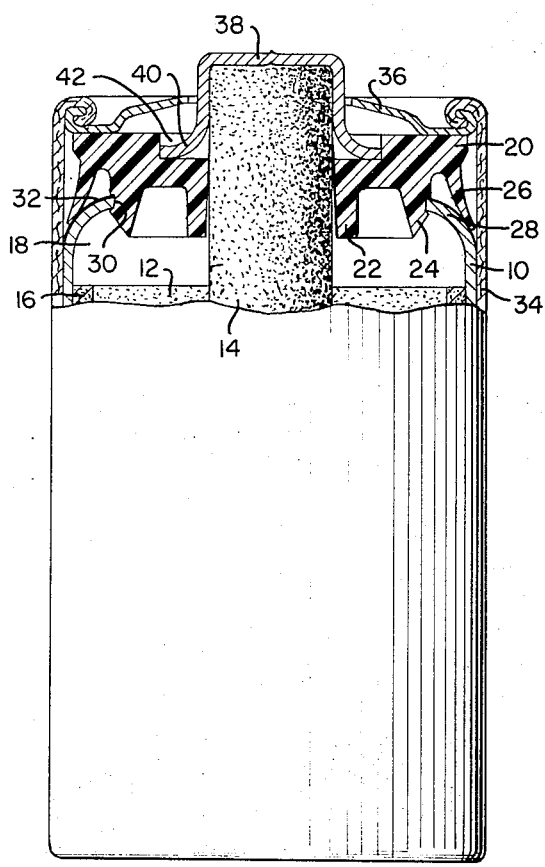
FIG. 1 is an elevational view, partly in cross-section, of a primary galvanic dry cell incorporating a preferred embodiment of the resealable vent closure of the invention.
Figure 2:
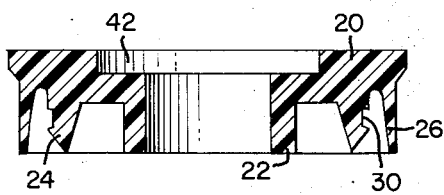
FIG. 2 is a vertical cross-sectional view of the resealable vent closure used in the dry cell shown in FIG. 1 prior to cell assembly.

Referring now to the drawing in detail and more particularly to FIGS. 1 and 2, there is shown a primary galvanic dry cell embodying the invention. The dry cell includes a cylindrical container 10 which is made of an electrochemically consumable metal such as zinc, e.g. a zinc can, and which serves as the anode for the cell. The cell container 10 includes therein the remaining electrochemically active cell ingredients in the form of a cathode depolarizer mix cake 12 containing, for instance, manganese dioxide, a conductive material such as carbon black or graphite and electrolyte. The cathode depolarizer mix cake 12 is molded around a central carbon cathode collector rod 14 which may be impregnated with a wax or an organic resin to render it both liquid and gas impermeable. The cathode depolarizer mix cake 12 is molded in a separate operation prior to cell assembly and is placed inside the cell container 10 with the upper end of the cathode collector rod 14 protruding through the open end of the cell container 10. A thin electrolyte paste separator layer 16 surrounds the cathode bobbin and separates the cathode depolarizer mix cake 12 from the inner side walls of the cell container 10. The separator may also be a thin film separator containing electrolyte, e.g., a thin bibulous paper coated with an electrolyte gel paste. The top of the cathode depolarizer mix cake 12 is disposed a short distance below the open end of the cell container 10 to provide the usual air space 18 to accommodate any liquid spew that may be formed on discharge of the cell.

An electrically insulating, corrosive resistant, resilient annular disc-like cover 20 is provided for sealing the open end of the cell container 10. As best shown in FIG. 2, the cover 20 is formed with three annular depending ring flanges on its underneath side, i.e. an inner flange 22, an intermediate flange 24 and an outer resilient thin wall flange 26. The inner flange 22 extends from below the inner peripheral edges of the cover 20. Both the inner flange 22 and intermediate flange 24 are spaced from and concentric with one another. The outer resilient thin wall flange 26 extends from below the outer peripheral edges of the cover 20 and is spaced from and concentric with the intermediate flange 24. The cover 20 is initially formed with the outer flange 26 extending perpendicularly from its outer peripheral edges. The cover 20 is molded in one piece from an electrically insulating, corrosive resistant, resilient plastic material. Suitable resilient plastic materials for this purpose include thermoplastic organic resins such as polyethylene and polypropylene, for example.

The upper peripheral edge portions of the cell container 10 are inwardly turned to form a smooth rounded crimped-over lip 28 surrounding the open end of the cell container 10. This inwardly crimped-over lip 28 may be formed using a conventional crimping tool which has the desired radius of crimp (e.g., approximately ¼ inch radius in the case of a standard "D" size zinc can). The crimping tool is forced over the upper side walls of the cell container 10 inwardly turning the lip 28 to the proper radius of curvature and setting the inner diameter of the open end of the cell container 10.

In the assembled dry cell as shown in FIG. 1, the inner portion of the cover 20 including both the inner and intermediate flanges 22, 24 overlies the open end of the cell container 10. The outer portion of the cover 20 including the outer flange 26 overlies the smooth rounded inwardly crimped-over lip 28. Both the inner and intermediate flanges 22, 24 extend down through the open end of the cell container 10. The outer flange 26 extends from the outer peripheral edges of the cover 20 toward and into contact engagement with the smooth round surfaces on the inwardly crimped-over lip 28.

The inner flange 22 fits tightly around the upper protruding end of the cathode collector rod 14 and forms both a liquid-and gas-tight seal juncture therewith. During assembly of the cell, the collector rod 14 may be inserted through the bottom of the inner flange 22 to establish an interference fit therewith. Preferably, the inner walls of the flange 22 are tapered outwardly at the bottom to facilitate entry of the collector rod 14. A light film of a sealant grease or asphaltic lacquer may be applied to the upper portion of the collector rod 14 before assembly if desired.

The intermediate flange 24 is made of such size as to fit snugly within the open end of the cell container 10. The flange 24 is formed around its outer side wall with an annular notch 30. The notch 30 engages with the inner edges on the inwardly crimped-over lip 28 thereby locking the cover 20 in place and forming a seal juncture therewith. This seal juncture is made tight enough to retard the outward free flow of liquid spew which may accumulate within the air space 18 but is not made so tight as to preclude the passage of gas therethrough.

During assembly of the dry cell, the cover 20 is placed on top of the cell container 10 with inner flange 22 surrounding the cathode collector rod 14. The cover 20 is then pressed downwardly so as to force the intermediate flange 24 through the open end of the cell container 10 until the inner edges of the inwardly crimped-over lip 28 snap into engagement with the notch 30 thereby locking the cover 20 in place. Preferably, as shown, the intermediate flange 24 is tapered inwardly around its lower end in order to facilitate this insertion operation. It will be understood that the degree of tightness of the seal which is formed when the cover 20 is snapped and locked into place can be readily established at the desired level by properly dimensioning the wall thickness of the intermediate flange 24 for the required resiliency and by properly selecting the depth of the notch 30.

The outer resilient thin wall flange 26 is made of a slightly smaller diameter than the cell container 10. Thus when the cover 20 is pressed downwardly over the open end of the cell container 10, the outer flange 26 flares outwardly and engages with the smooth round surfaces on the crimped-over lip 28 in interference fit. The resilient stress in the flange 26 and in the outer portion of the cover 20 insures an effective fluid-tight seal around the open end of the cell container 10.

This fluid-tight seal remains closed during normal shelf storage and operation of the dry cell. Hence, the cell is effectively sealed against the escape of electrolyte or moisture by evaporation and is also sealed against the ingress of air or oxygen from the atmosphere. Occasionally, during use of the cell and especially when the cell is subjected to severe or abusive conditions of discharge, the gas pressure inside the cell container 10 may reach an undesirable or excessive level. The development of this excessive gas pressure causes the outer flange 26 to further flare outwardly or deflect in a direction away from the inwardly crimped-over lip 28 thereby breaking the seal and allowing gas to escape or vent from inside the cell container 10. The gas follows a path from within the air space 18 below the cover 20, through the juncture formed between the notch 30 and the inner edges of the lip 28 and thence into the annular space defined between the intermediate flange 24 and the outer flange 26 which is sealed off during normal use of the cell. It should be understood that since the seal juncture is gas-permeable, the gas pressure inside this annular space is substantially the same as the gas pressure inside the cell container 10. Once the gas pressure has been released, the resiliency of the outer flange 26 causes it to reseat and to reestablish the seal. It will be seen then that the outer flange 26 acts as a resilient flapper valve member which is one part of a vent valve for periodically releasing an excessive gas pressure from inside the cell container 10. The other part of this vent valve, namely the valve seat, is formed by the smooth rounded inwardly crimped-over lip 28 surrounding the open end of the cell container 10.

In order to enhance the effectiveness of the fluid-tight seal, a thin layer of non-hardening and nonmelting grease may be applied to the sealing surfaces of the crimped-over lip 28 as denoted at 32. This thin layer of grease also repels moisture and serves as a lubricant to aid the assembly of the cover 20.

The cell proper (i.e. raw cell) with the cover 20 locked in place at the open end of the cell container 10 is finished by encasing it within an outer cell assembly including an outer tubular non-corrodible jacket 34 suitably made of a fibrous material such as kraft paper. The upper end of the tubular jacket 34 extends beyond the cover 20 and is locked in engagement with the outer peripheral edges of an annular metallic top closure plate 36. This top closure plate 36 is positioned over and in contact with the outer top portion of the cover 20. The locked engagement between the top closure plate 36 and the jacket 34 causes the plate 36 to bear down upon the cover 20 and thus further assures that the cover 20 is tightly locked in place within the open end of the cell container 10. A metallic positive terminal cap 38 is fitted tightly over the top end of the cathode collector rod 14 and protrudes slightly through the center opening in the top closure plate 36. The positive terminal cap 38 is provided with an outwardly flanged lower end 40 which resides in an annular recess 42 situated above inner flange 22. Although not shown in the drawing, a similar metallic bottom closure member is locked in engagement with the lower end of the tubular jacket 34.

The outer cell assembly includes means for venting any gas released from inside the cell container 10 to the outer atmosphere. Such means may be provided, for example, by making the locked engagement between the top closure plate 36 and the jacket 34 permeable to gas.

As one example of the invention, a number of "AA" size primary dry cells were made of a construction substantially as shown in FIG. 1. These cells exhibited an internal gas venting pressure in the range of about 20 to 25 pounds per square inch. Other cells of a similar construction were made and vented at pressures of about 60 pounds per square inch. It will be understood that the internal gas venting pressure can be varied over a wide range by properly adjusting the resiliency and the degree of stretching of the outer resilient thin wall flange 26.

Figure 3:
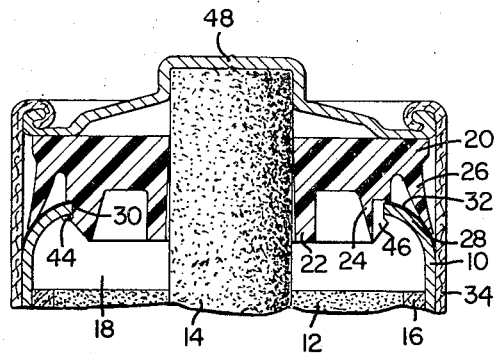
FIG. 3 is an elevational cross-sectional view of the top portion of a dry cell illustrating another embodiment of the invention.
Figure 4:
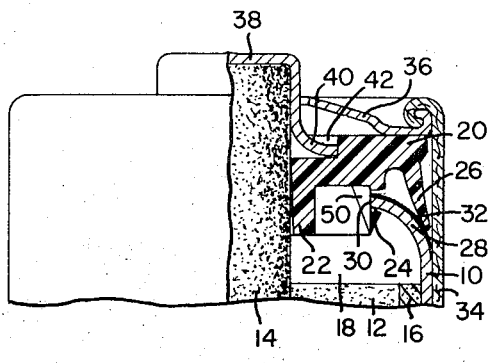
FIG. 4 is an elevational view, partly in cross-section, of the top portion of a dry cell illustrating still another embodiment.
Figure 5:
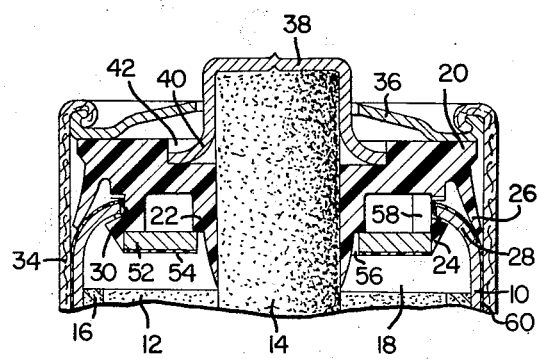
FIG. 5 is an elevational cross-sectional view of the top portion of a dry cell illustrating still another embodiment.

In the embodiment of the invention shown in FIG. 1, separation of the gas from the liquid spew in the air space 18 below the cover 20 is attained to a degree depending on the tightness of the juncture formed between the notch 30 and the inner edges of the crimped-over lip 28 and also on the orientation of the cell. FIGS. 3-5 show several other embodiments of the invention wherein improved means for attaining separation of the gas from the liquid spew are provided. These additional embodiments also illustrate modified gas venting paths through the closure assembly.

FIG. 3 shows one such embodiment wherein a liquid- and gas-impermeable sealant 44 such as heavy grease or asphalt is applied to the mating surfaces between the notch 30 and the inner edges of the lip 28. The sealant 44 may be applied around the mating surfaces in such a manner so as to leave one or more non-coated areas (now shown) which act as venting paths. Preferably, however, the venting paths are provided by the provision of one or more slots 46 formed in the outer side wall of the intermediate flange 24. The slots 46 provide an open passage between the air space 18 and the notch 30. In this instance, the sealant 44 may be applied completely around the mating surfaces except in the area of the slots 46. It will be apparent that the snap-in closure engagement need not be made quite so tight when the sealant 44 is used. Thus the necessity for maintaining closure tolerances in the assembly of the cover 20 is eliminated. It will also be noted that in this embodiment of the invention the dry cell employs a one-piece top closure plate 48 fitted tightly over the top of the cathode collector rod 14 and having its outer peripheral edges locked in engagement with the upper edges of the tubular jacket 34.

In FIG. 4, an alternate gas-venting path may be provided by one or more slots 50 formed in the inner side wall of the intermediate flange 24. These slots 50 communicate with the notch 30 to allow gas to escape from inside the cell container 10. As illustrated in the previous embodiment, a sealant such as asphalt (not shown) is preferably applied around the mating surfaces between the notch 30 and the lip 28.

FIG. 5 shows still another embodiment wherein a liquid-separating or filter medium is incorporated into the resealable vent closure in order to more effectively separate the gas from the liquid spew in the air space 18 below the cover 20. This separating or filter medium may take the form of a liquid-absorbing "soakup" washer 52 fitted in the space between the intermediate flange 24 and the inner flange 22. For more effective action, the "soakup" washer 52 has its lower surface facing the cell interior coated with a gas-impermeable plastic film 54 which is heat sealed thereto and/or bonded at its outer edges to the flange 24. In this embodiment, the inner flange 22 is inwardly tapered at its lower end to provide an annular space 56 communicating with the inner peripheral edges of the "soakup" washer 52. It will be seen then that the gas follows a path through the annular space 56 and into the "soakup" washer 52 where any liquid entrained with the gas is absorbed. The gas venting path in this embodiment is otherwise the same as that shown in FIG. 4, i.e., the gas follows a path through one or more slots 58 formed in the inner side wall of the intermediate flange 24 communicating with the notch 30.

The embodiment of the invention shown in FIG. 5 further includes a shrink film tubing 60 applied around the outer side walls of the cell container 10. This tubing 60 is heat shrunk to tightly engage with the outer surfaces of the cell container 10 and serves to provide a barrier against leakage in the event that the container 10 should perforate early during use of the dry cell. The tubing 60 may also serve as a sealant with or without the thin grease layer used in the previously discussed embodiments of the invention.

A number of modifications of the above described embodiment utilizing a liquid-separating or filter medium are of course possible. For example, a "soakup" washer made from sintered polytetrafloroethylene powder or foamed polyurethane might be positioned in the same location between the inner and intermediate flanges 22, 24. In this modification, the "soakup" washer would act either as a liquid barrier member or as a liquid absorbent member depending on its wettability by the liquid spew.

Although not illustrated in the drawing, the resealable vent closure of the invention may be assembled together with the outer tubular jacket used to finish the dry cell. In this modification, the tubular jacket is preferably made of the same resilient, corrosive resistant, plastic material as the cover 20 and may be either mechanically joined to or molded integrally with the outer portion of the cover 20. A positive terminal cap positioned over the protruding end of the cathode collector rod 14 may be provided in a manner similar to that illustrated in FIG. 1. The advantage of this modification is that the metallic top closure plate may be eliminated thereby reducing the manufacturing cost of the dry cell.

It will be apparent to anyone skilled in the art that various other changes and modifications may be made in the several illustrated embodiments without departing from the spirit and scope of the invention. Thus the snap-in locking feature of the cover assembly can be modified by making the engagement between the intermediate flange 24 and the inner edge of the crimped-over lip 28 on the cell container 10 completely open to the passage of liquid and gas, thus eliminating any attempt to separate the gas from the liquid spew in the air space 18 below the cover 20. In this instance, the cell closure depends solely upon the normally closed fluid-tight seal of the vent valve to prevent the escape of significant amounts of liquid spew from the inside of the cell. Additionally, the snap-in locking feature of the cover assembly may be accomplished in other ways such as by providing a bead or ring boss on the outer side wall of the intermediate flange 24 to engage below the inner edges of the lip 28 thereby locking the cover 20 in place. Of course, the snap-in locking feature may be eliminated altogether and the cover 20 locked in place around the open end of the cell container 10 by other means such as by the engagement of the metallic top closure plate with the top surfaces of the cover 20 as above described. It will be further evident that the valve seat may be formed otherwise than by rounding over the upper peripheral edge portions of the cell container 10. Thus the peripheral edge portions of the container 10 may be angularly turned inwardly to provide a smooth straight tapered conical surface forming the valve seat. It will be even further evident that in those cases where it is desirable to continuously vent small amounts of gas from inside the cell container 10, a porous carbon gas venting electrode could be used to replace the impregnated carbon cathode collector rod 14.

Thus the invention provides a resealable vent closure for the open end of a cylindrical container used in a sealed galvanic dry cell which requires the very minimum number of parts and which is therefore relatively inexpensive to manufacture. The resealable vent closure can be easily and accurately assembled during manufacture of the dry cell and gives highly reliable and reproducible results in releasing excessive gas pressure from inside the dry cell. Moreover, the resealable vent closure when used in a dry cell employing an outer cell assembly including a tubular jacket is not exposed to external pressures or impact and is therefore less prone to accidental damage.

The resealable vent closure of the invention offers a number of other advantages which should readily occur to those skilled in the art. For example, the dry cell is completely sealed during manufacture once the resealable vent closure has been assembled. Thus the dry cell may be held in "aging storage" for a period of days before final voltage and amperage tests are made without the cell drying out. Only those cells which pass these final tests are then finished with the outer cell assembly. The expense of finishing any cells which exhibit a poor voltage or amperage on tests is thereby eliminated. Another advantage is that the resealable vent closure is sealed against the outside surfaces of the cell container. These surfaces are ordinarily easy to clean and keep clean during cell manufacture.

What is claimed is:

1. A sealed galvanic dry cell comprising, in combination: a cylindrical container having an open end and including therein active ingredients of said cell, a cover for the open end of said container, said cover including an inner portion overlying the open end of said container and an outer portion, means for locking said cover in place at the open end of said container, and a resealable vent for releasing excessive gas pressure from inside said container, said resealable vent comprising a smooth inwardly extending valve seat surrounding the peripheral edge portions of said container at the open end thereof and an annular resilient flapper valve member extending from the outer portion of said cover towards said valve seat and being biased into sealing relationship with said valve seat to form a normally closed fluid-tight seal therebetween but being otherwise free to deflect in a direction away from said valve seat upon the development of an excessive gas pressure inside said container momentarily breaking the seal and allowing gas to escape from inside said container.

2. A sealed galvanic dry cell comprising, in combination:
   a cylindrical container having an open end and including therein active ingredients of said cell;
   the peripheral edge portions of said container being inwardly turned forming a smooth valve seating surface;
   a cover for the open end of said container, said cover including an inner and an outer portion, said inner portion overlying the open end of said container;
   an inner flange member extending from the inner portion of said cover through the open end of said container;
   means cooperating between said inner flange member and the inwardly turned peripheral edge portions of said container for locking said cover in place at the open end of said container; and
   a resilient annular flapper valve member extending from the outer portion of said cover towards the smooth valve seating surface formed by the inwardly turned peripheral edge portions of said container;
   the arrangement being such that when said cover is locked in place said resilient annular flapper valve member is caused to engage with the smooth valve seating surface formed by the inwardly turned peripheral edge portions of said container thereby forming a normally closed fluid-tight seal therebetween, said resilient annular flapper valve member being otherwise free to deflect in a direction away from the smooth valve seating surface upon the development of an excessive gas pressure inside said container momentarily breaking the seal and allowing gas to escape from inside said container.

3. A sealed galvanic dry cell as defined by claim 2 wherein the resilient annular flapper valve member comprises a resilient thin wall ring flange extending from the outer peripheral edges of said cover towards the inwardly turned peripheral edge portions of said container forming the smooth valve seating surface.

4. A sealed galvanic dry cell as defined by claim 3 wherein the smooth valve seating surface is formed by inwardly crimping over the peripheral edge portions of said container at the open end thereof.

5. A sealed galvanic dry cell as defined by claim 2 wherein the means for locking said cover in place at the open end of said container comprises a annular notch formed around the outer side wall of said inner flange member.

6. A sealed galvanic dry cell comprising, in combination:
   a cylindrical container having an open end and having therein active ingredients of said cell including a cathode depolarizer mix cake;
   the peripheral edge portions of said container being inwardly turned forming a smooth valve seating surface;
   a cathode collector rod embedded in said cathode depolarizer mix cake and protruding through the open end of said container;
   an annular disc-like cover for the open end of said container, said cover fitting around the protruding end of said cathode collector rod;
   said cover including an inner portion overlying the open end of said container and an outer portion overlying the inwardly turned peripheral edge portions of said container;
   the outer portion of said cover including an integrally formed outer resilient thin wall ring flange extending towards the smooth valve seating surface formed by the inwardly turned peripheral edge portions of said container; and
   the inner portion of said cover including an integrally formed inner ring flange extending from the inner peripheral edges of said cover and fitting tightly around said cathode collector rod and an integrally formed intermediate ring flange extending through the open end of said container;
   said intermediate ring flange including means engaging with the inner edges of the inwardly turned peripheral edge portions of said container for locking said cover in place within the open end of said container;
   the arrangement being such that when said cover is locked in place said outer resilient thin wall ring flange is caused to engage with the smooth valve seating surface formed by the inwardly turned peripheral edge portions of said container thereby forming a normally closed fluid-tight seal therebetween, said outer resilient thin wall ring flange being otherwise free to deflect in a direction away from the smooth valve seating surface upon the development of an excessive gas pressure inside said container momentarily breaking the seal and allowing gas to escape from inside said container.

7. A sealed galvanic dry cell as defined by claim 6 wherein the peripheral edge portions of said container are inwardly turned to form a smooth rounded crimped-over lip, said crimped-over lip forming the smooth valve seating surface.

8. A sealed galvanic dry cell as defined by claim 7 wherein the intermediate ring flange is formed on its outer side wall with an annular notch which engages with the inner edges of the inwardly crimped-over lip to lock said cover in place within the open end of said container.

9. A sealed galvanic dry cell as defined by claim 8 wherein a liquid-and gas-impermeable sealant is applied around portions of the engagement between said annular notch and the inner edges of the inwardly crimped-over lip, the engagement including other portions not sealed by the sealant which are gas permeable and which constitute gas venting paths from inside said container.

10. A sealed galvanic dry cell as defined by claim 7 wherein a thin sealant layer is applied around the inwardly crimped-over lip surrounding the open end of said container.

11. A sealed galvanic dry cell as defined by claim 7 wherein the intermediate ring flange is formed on its outer side wall with one or more slots communicating with said annular notch and constituting gas venting paths from inside said container.

12. A sealed galvanic dry cell as defined by claim 7 wherein the intermediate ring flange is formed on its inner side wall with one or more slots communicating with said annular notch and constituting gas venting paths from inside said container.

13. A sealed galvanic dry cell as defined by claim 12 wherein a liquid-separating medium is positioned between said inner ring flange and said intermediate ring flange for separating liquid from the gas to be vented from inside said container.

14. A sealed galvanic dry cell as defined by claim 13 wherein the liquid-separating medium comprises a liquid absorbent washer.

15. A sealed galvanic dry cell as defined by claim 14 wherein the liquid absorbent washer is coated at one side facing the cell interior with a gas-impermeable plastic film and wherein at least one of said inner ring flange and said intermediate ring flange is further provided with a slot exposing one edge of said washer to the cell interior providing a path for venting gas from inside said container.

16. A sealed galvanic dry cell comprising, in combination:

a cylindrical container having an open end and having therein active ingredients of said cell including a cathode depolarizer mix cake;

the peripheral edge portions of said container being inwardly crimped-over forming a smooth rounded valve seating surface;

a cathode collector rod embedded in said cathode depolarizer mix cake and protruding through the open end of said container;

an annular disc-like cover for the open end of said container, said cover fitting tightly around the protruding end of said cathode collector rod;

said cover including an inner portion overlying the open end of said container and an outer portion overlying the inwardly crimped-over peripheral edge portions of said container;

the outer portion of said cover including an integrally formed outer resilient thin wall ring flange extending towards the smooth rounded valve seating surface formed by the inwardly crimped-over peripheral edge portions of said container;

the inner portion of said cover including an integrally formed ring flange extending through the open end of said container;

said ring flange having an annular notch formed on its outer side wall which engages with the inner edges of the inwardly crimped-over peripheral edge portions of said container for locking said cover in place within the open end of said container;

the arrangement being such that when said cover is locked in place said outer resilient thin wall ring flange is caused to engage with the smooth rounded valve seating surface formed by the inwardly crimped-over peripheral edge portions of said container thereby forming a normally closed fluid-tight seal therebetween, said outer resilient thin wall ring flange being otherwise free to deflect in a direction away from the smooth valve seating surface upon the development of an excessive gas pressure inside said container momentarily breaking the seal and allowing gas to escape from inside said container.

* * * * *